Oct. 12, 1926.   1,602,648
C. CARSON
DEVICE FOR PREVENTING THE UNAUTHORIZED USE OF MOTOR VEHICLES
Filed Oct. 20, 1923   3 Sheets-Sheet 1
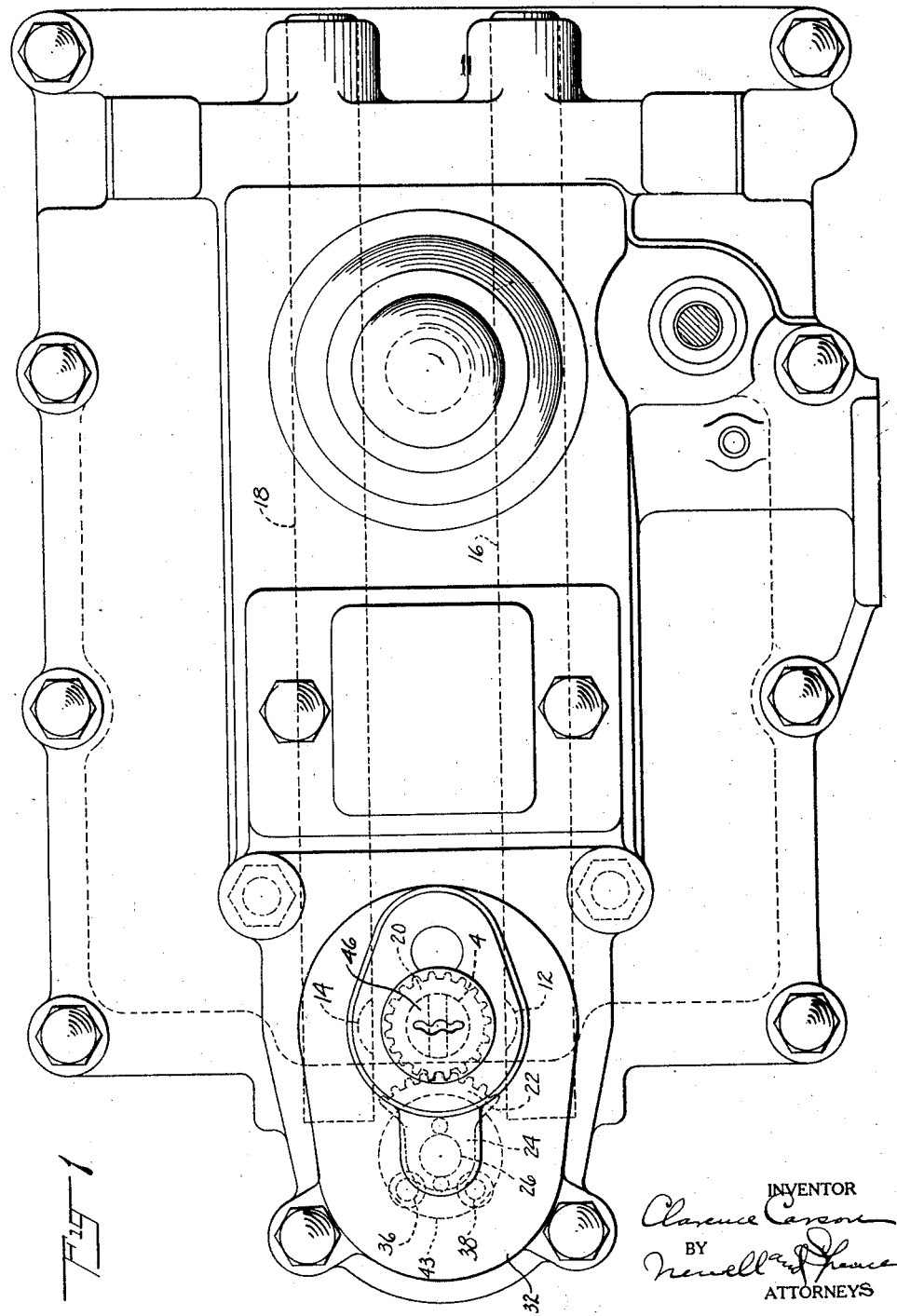

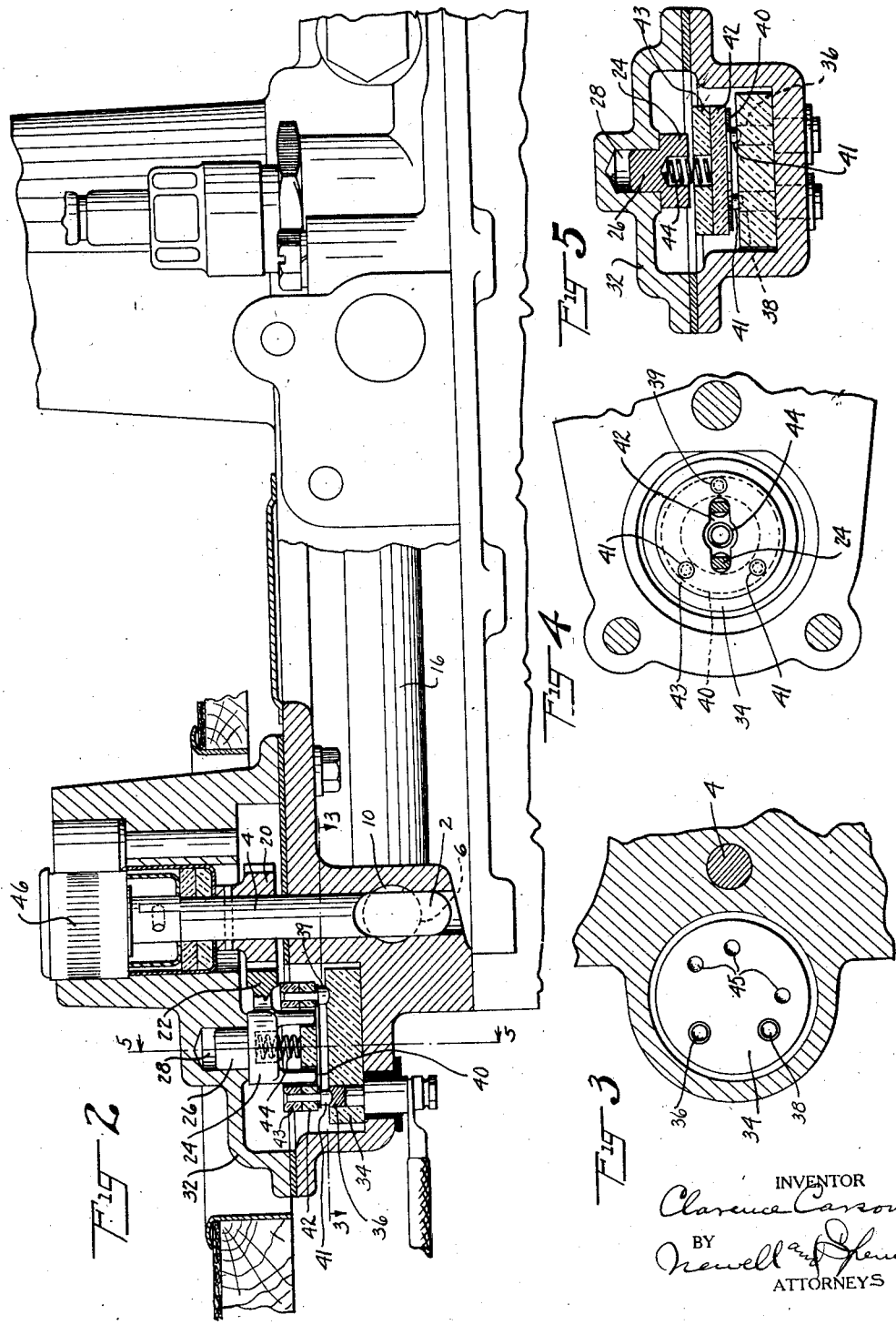

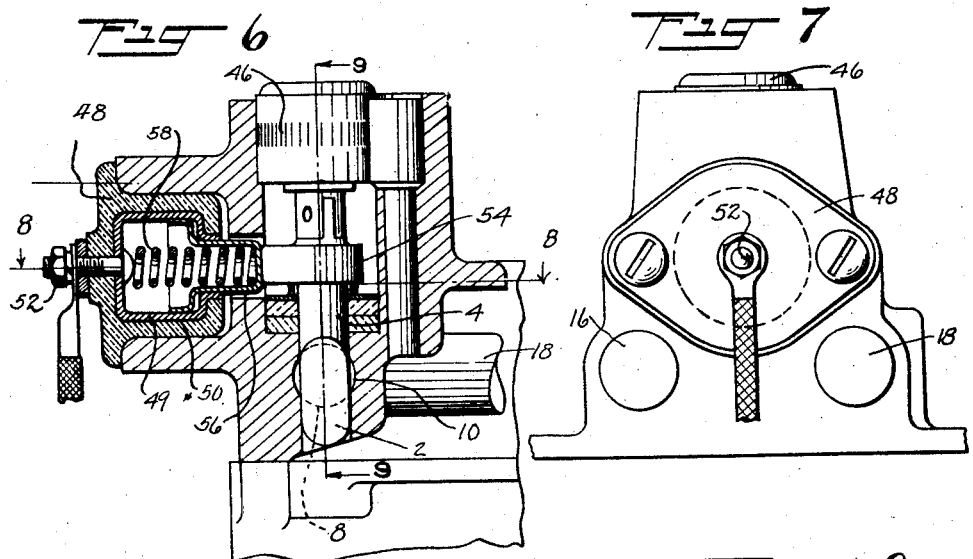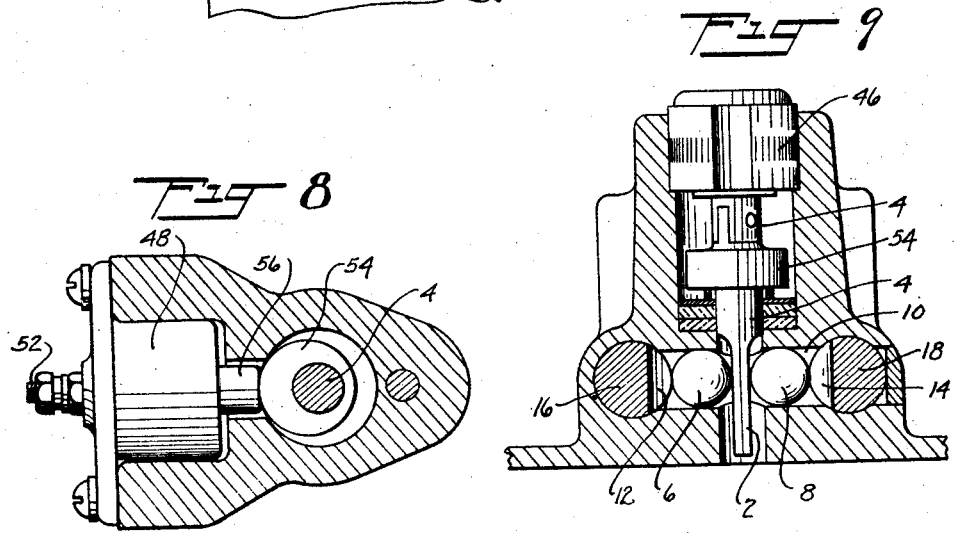

Patented Oct. 12, 1926.

1,602,648

UNITED STATES PATENT OFFICE.

CLARENCE CARSON, OF DETROIT, MICHIGAN, ASSIGNOR, BY MESNE ASSIGNMENTS, TO DODGE BROTHERS, INC., A CORPORATION OF MARYLAND.

DEVICE FOR PREVENTING THE UNAUTHORIZED USE OF MOTOR VEHICLES.

Application filed October 20, 1923. Serial No. 669,873.

This invention relates to devices for preventing the unauthorized use of motor vehicles, and has for its general object to provide a substantially thief proof vehicle locking mechanism which is so constructed and arranged as practically to force the owner or operator of the vehicle to put the mechanism in locking condition before leaving the vehicle unattended.

Insurance companies making a business of insuring automobiles against theft have found that in a very large percentage of the cases the stolen cars upon which claims are made have been equipped with approved locking mechanisms of the types upon which lower premium rates are granted, but that the owner or operator of the automobile, through inadvertence or sheer laziness, has failed to put the locking mechanism in locking condition.

A particular object of the present invention is so to combine a locking mechanism of one of the approved types with the ignition switch of the vehicle that in order to operate the ignition switch to stop the motor it will be necessary to put the locking mechanism in locking condition.

Other objects and important features of the invention will appear from the following description and claim when considered in connection with the accompanying drawings, in which—

Fig. 1 is a plan view of the transmission housing of an automobile embodying the present invention, the illustrated housing being of the type employed with the Dodge Brothers motor car;

Fig. 2 is a side elevation of the upper part of the housing with the combined transmission lock and ignition switch mechanism shown in vertical section;

Fig. 3 is a horizontal section on the line 3—3 of Fig. 2;

Fig. 4 is a detail plan view of the ignition switch assembly;

Fig. 5 is a section on the line 5—5 of Fig. 2 through the ignition switch;

Fig. 6 is a vertical section through a modified construction of a combined transmission lock and ignition switch;

Fig. 7 is a view in elevation of the construction shown in Fig. 6;

Fig. 8 is a sectional plan view of the construction shown in Fig. 6, and

Fig. 9 is a vertical section through the lock for locking the gear shifting slides of the transmission in neutral position.

The vehicle locking mechanism herein illustrated is preferably of the type which locks the transmission in neutral position, the illustrated transmission locking means being of the type disclosed in U. S. Letters Patent #1,280,589, granted October 1, 1918, to Charles G. Trosien, and comprising, as shown particularly in Fig. 9 of the drawings, a rotatable cam 2 on the lower end of a vertical shaft or spindle 4, this cam being located between balls or plungers 6 and 8 movable in a transverse guideway 10 into and out of recesses 12 and 14 in the respective gear shifting slides 16 and 18 of the transmission. The recesses 12 and 14 are so located on the slides that when the slides are in neutral position, that is, when the transmission is neutral, the recesses will be opposite the ends of the guideway 10. When, therefore, the balls or plungers 6 and 8 are forced laterally into these recesses the transmission will be locked in this neutral position. A mere turning of the cam 2 through an arc of 90° will effect such locking of the transmission.

In both forms of the invention herein illustrated, rotation or oscillation of the shaft or spindle 4 of the transmission locking mechanism is arranged to effect the opening and closing of the ignition circuit.

In the form of the invention shown in Figs. 1 to 5 inclusive, a gear 20 carried on the shaft or spindle 4 engages a segment gear 22 connected to an ignition switch. As shown particularly in Figs. 2 and 5, the member 24 to which the segment gear 22 is attached has projecting from its upper side a small stud shaft 26 arranged to turn in a bearing recess 28 in that part of the housing 32 which encloses the switch. In the lower part of the housing 32 is an insulating disk 34 through the upper face of which extend contacts 36 and 38 adapted to be bridged by engagement with contacts 41 connected by a metallic plate 40 to close the ignition circuit. The plate 40 and contacts 41 are carried by a fibre disk 42 which in turn is carried by the member 24 to which the segment 22 is attached. A spring 44 between the fibre support for the strip 40 and contacts 41 and the member 24 serves to press the contacts 41 into engagement with the contacts 36 and 38.

The contacts 36 and 38 preferably have slight depressions in their upper ends so that when the contacts 41 are in position over the contacts 36 and 38 they are yieldingly retained in this position by the spring 44. A third pin 39 similar to the contacts 41 is carried by the insulating disk 42 at a point substantially equally distant from the contacts 36, 38, to equalize the pressure of the spring 44 upon the contacts 41, 42, and also to help in holding the switch in its different positions. The insulating disk 34 is preferably provided with depressions 45 shown in Fig. 3 of the drawings, two of these depressions cooperating with the pin 39 when the switch is turned through 90° from its "on" to its "off" position, and vice versa, and the third depression receiving one of the contacts 41 in the "off" position of the switch.

The spindle 4 may be operated by any suitable key operated lock 46 suitably protected by the housing, the lock 46 serving, when the key is withdrawn, to lock the spindle in its slide-locking position, thus preventing unauthorized operation of the vehicle.

In the form of the invention shown in Figs. 6, 7, and 8, the locking mechanism for locking the gear shifting slides in neutral position is substantially the same as that shown in Figs. 1 to 5 inclusive, but the construction of the ignition switch and the mode of operating this switch are modified. In the modified construction the ignition switch is carried in a housing 48 of insulating material having a sheet metal lining 49, said housing being inserted in a recess 50 in the main transmission housing. One side of the ignition circuit is grounded through the frame when closed and this side, comprising the terminal 52, is connected with the sheet metal lining 49 of the housing 48. The completion of the circuit in the illustrated modified construction is adapted to be effected through the engagement of a metallic cam 54 on the spindle 4 of the lock with a plunger 56 comprising a hollow metal stamping projecting into the metallic lining 49 of the case 48, this plunger being normally pressed to its outermost position by a spring 58.

When the lock spindle 4 is in its locking position, as shown in Fig. 8 of the drawings, the cam 54 is turned into engagement with the plunger 56 and the ignition circuit is grounded through the spindle and frame. When, however, the spindle 4 is turned into its unlocking position as shown in Fig. 9, the cam 54 is turned so that it is no longer in engagement with the plunger 56 and the ignition circuit is therefore broken.

In the form of the invention herein illustrated and specifically described, the ignition switch is shown as arranged for use with a battery ignition system in which the switch is open when the lock is in transmission locking position and is closed when the transmission is unlocked. It will be understood, however, that the invention is equally applicable to ignition systems in which a magneto is employed and in which the ignition is ordinarily turned off by short-circuiting one side of the breaker. In such systems the ignition switch would ordinarily be closed when the ignition is turned off and opened when it is turned on, the particular condition of the switch required to effect the turning off of the ignition being immaterial so far as this invention is concerned, provided it be in proper time relation to the locking and unlocking of the transmission, that is, so positioned that the ignition be turned off when the car is locked and turned on when it is unlocked and that the mechanisms for effecting these operations be interlocked.

From the foregoing description it will be seen that the owner or operator of the vehicle when leaving it must lock the vehicle when he turns off the ignition switch, thus practically forcing him in the usual practice to lock the car before he leaves it.

What I claim as new is:

In a motor vehicle, a transmission lock comprising a spindle having an eccentric contact member thereon, said spindle oscillating between two positions of rest in the operation of said lock to lock and unlock the transmission, an ignition circuit including said contact member, a second contact member comprising a plunger forming one part of a self-contained telescoping spring housing having the telescoping members interlocked to limit the extension thereof by the contained spring, and an insulating support for said housing, said parts being so located that said plunger stops short of said eccentric contact member in one rest position thereof and is moved by said eccentric member against the tension of the spring when moving to its other rest position.

Signed at Detroit, Mich., this 17th day of October, 1923.

CLARENCE CARSON.